(12) United States Patent
Horne et al.

(10) Patent No.: US 10,732,069 B2
(45) Date of Patent: Aug. 4, 2020

(54) FLUID FLOW DETECTION AND ANALYSIS DEVICE AND SYSTEM

(71) Applicant: AquaSeca Inc., Sunnyvale, CA (US)

(72) Inventors: Stephen J. Horne, El Granada, CA (US); Robert L. MacDonald, Sunnyvale, CA (US); Marc A. Finot, Palo Alto, CA (US); Eric Allen Moon, Seattle, WA (US)

(73) Assignee: AquaSeca Inc., San Jose, CA (US)

( * ) Notice: Subject to any disclaimer, the term of this patent is extended or adjusted under 35 U.S.C. 154(b) by 54 days.

(21) Appl. No.: 15/605,657

(22) Filed: May 25, 2017

(65) Prior Publication Data

US 2017/0261397 A1 Sep. 14, 2017

Related U.S. Application Data

(63) Continuation of application No. 14/097,227, filed on Dec. 4, 2013, now Pat. No. 9,664,589.

(60) Provisional application No. 61/733,207, filed on Dec. 4, 2012.

(51) Int. Cl.
| | |
|---|---|
| *G01M 3/28* | (2006.01) |
| *G01F 1/66* | (2006.01) |
| *F17D 5/06* | (2006.01) |
| *G01M 3/24* | (2006.01) |

(52) U.S. Cl.
CPC .............. *G01M 3/2807* (2013.01); *F17D 5/06* (2013.01); *G01F 1/66* (2013.01); *G01M 3/243* (2013.01)

(58) Field of Classification Search
USPC .............................................. 73/40.5 A, 49.1
See application file for complete search history.

(56) References Cited

U.S. PATENT DOCUMENTS

| | | | |
|---|---|---|---|
| 3,580,092 | A | 5/1971 | Scarpa |
| 3,906,780 | A | 9/1975 | Baldwin |
| 5,349,568 | A | 9/1994 | Kupperman et al. |
| 5,353,627 | A | 10/1994 | Diatschenko et al. |
| 5,416,724 | A | 5/1995 | Savic |
| 5,974,862 | A | 11/1999 | Lander et al. |
| 6,567,006 | B1 | 5/2003 | Lander et al. |
| 7,274,996 | B2 | 9/2007 | Lapinski et al. |

(Continued)

FOREIGN PATENT DOCUMENTS

| | | |
|---|---|---|
| CN | 101008992 A | 8/2007 |
| CN | 101246467 A | 8/2008 |

(Continued)

OTHER PUBLICATIONS

Office Action dated May 22, 2017 for Chinese Patent Application No. 201380063437.3.

(Continued)

*Primary Examiner* — Daniel S Larkin
(74) *Attorney, Agent, or Firm* — MLO, a professional corp.

(57) ABSTRACT

A fluid monitoring system has a plurality of sensors, the sensors being acoustically coupled to a pipe system containing interconnected fluid-transporting pipes. The sensors collect sensor data that is analyzed by an analysis system to provide leak identification on the pipe system. Each sensor in the plurality of sensors is configured to be programmed adaptively by the analysis system to improve system performance parameters. A method for analyzing fluid flow is also described in which data from a plurality of acoustic sensing devices is analyzed using learning algorithms.

16 Claims, 4 Drawing Sheets

(56) References Cited

U.S. PATENT DOCUMENTS

| | | |
|---|---|---|
| 7,562,584 B2 | 7/2009 | Conquergood |
| 8,166,823 B2 | 5/2012 | Lam et al. |
| 8,494,932 B2 | 7/2013 | Shen |
| 8,539,820 B2 | 9/2013 | Al-Qahtani et al. |
| 9,664,589 B2 | 5/2017 | Horne et al. |
| 2002/0073768 A1 | 6/2002 | Joynes |
| 2002/0124666 A1 | 9/2002 | Navarro et al. |
| 2003/0167847 A1 | 9/2003 | Brown et al. |
| 2004/0035190 A1 | 2/2004 | Sinha |
| 2005/0279169 A1 | 12/2005 | Lander |
| 2006/0219438 A1 | 10/2006 | Moore et al. |
| 2006/0225514 A1 | 10/2006 | Conquergood |
| 2007/0206521 A1 | 9/2007 | Osaje |
| 2012/0103069 A1 | 5/2012 | Al-Qahtani et al. |
| 2013/0197833 A1 | 8/2013 | Israeli et al. |

FOREIGN PATENT DOCUMENTS

| | | |
|---|---|---|
| CN | 101539241 A | 9/2009 |
| EP | 0605944 A2 | 7/1994 |
| WO | 2006128122 A2 | 11/2006 |

OTHER PUBLICATIONS

Office action dated Nov. 16, 2017 for Chinese Patent Application No. 201380063437.3.
European Search Report dated Jul. 1, 2016 for EPO Application No. 138060742.9.
International Search Report and Written Opinion dated Mar. 24, 2014 for PCT Patent Application No. PCT/US2013/073200.
Notice of Allowance dated Apr. 18, 2017 for U.S. Appl. No. 14/097,227.
Office Action dated Feb. 15, 2017 for U.S. Appl. No. 14/097,227.
Office Action dated Oct. 5, 2015 for U.S. Appl. No. 14/097,227.

FLUID FLOW DETECTION AND ANALYSIS DEVICE AND SYSTEM

RELATED APPLICATIONS

This application is a continuation of U.S. patent application Ser. No. 14/097,227, entitled "Fluid Flow Detection and Analysis Device and System," filed on Dec. 4, 2013; which claims priority to U.S. Provisional Patent Application No. 61/733,207, entitled "Fluid Detection and Analysis" and filed on Dec. 4, 2012; all of which are hereby incorporated by reference for all purposes.

BACKGROUND OF THE INVENTION

Fluid flow and leak detection systems for plumbing systems provide a valuable function by protecting the surrounding environment (indoor or outdoor) from damage due to fluid leakage. Such damage can far exceed the cost of the leaked fluid, and the combined annual cost of building damage from leaking plumbing systems exceeds $1B in the United States. Leaks in outdoor plumbing systems are also a pervasive problem, with industry analysts estimating that 30% of treated potable water is lost to leaks.

Despite the pervasive nature and high consequential cost of plumbing leaks, products capable of detecting leaks that have been on the market for many years have seen limited market penetration.

Systems designed for identifying leaks in indoor plumbing systems are currently either too costly, too difficult to install or provide limited protection. The dominant approach for such systems relies on moisture sensors that are activated by contact with pooling water under or near the leak.

It is common to see apparatuses that either employ a float-switch or an electronic moisture sensor as the detection apparatus. These apparatuses, an example given by the Leak Alert water detector by Zircon, resemble a puck or small box which is placed in an area where fluid pooling is expected upon the failure of a local pipe system. An example would be at the lowest point of the floor under the water circuit of an air conditioning system. Another example of this category employs the use of Time Domain Reflectometry (TDR) or impedance changes to detect moisture contacting a wire or mesh of wires. These apparatuses, an example being the ProH2O system by Safe Fire Detection, Inc, have a small sensing unit connected to a length of detection cable or wire, which is strung in an area expected to become wet upon the failure of a local pipe system.

Using apparatuses of this category requires precise knowledge of where leaked fluid will flow and requires a sufficient volume—sometimes significant—of leaked fluid to pool at the apparatus in order for a leak to be detected. Additionally, because they detect fluid only locally, a large number of such apparatuses are needed for adequate surveillance of a significant pipe network, for example that found in a residence or commercial building.

Leaks in outdoor plumbing systems are generally detected using highly trained professionals with sophisticated and costly portable acoustic monitoring equipment. These units are affixed to elements in the plumbing network such as fire hydrants, and the equipment picks up sounds that trained personnel can recognize as originating from underground leaks. While proven effective, this labor-intensive approach proves too costly for continuous or widespread use. Furthermore, the specialized nature of the identification limits the scalability of this approach.

Another approach to leak detection utilizes highly accurate flow meters that enable system operators to identify leaks through mass-balance calculations. Sensors used in these systems require high accuracy, and as a result are focused only on the flow conditions in the pipe to which they are attached. Additionally, their high accuracy usually comes with moderate to high power requirements, high cost and sometimes difficulty of installation. The high power requirement can be especially problematic because it either precludes battery operation, or the product has a short lifetime between battery replacements.

DETAILED DESCRIPTION OF THE EMBODIMENTS

Figure 1:
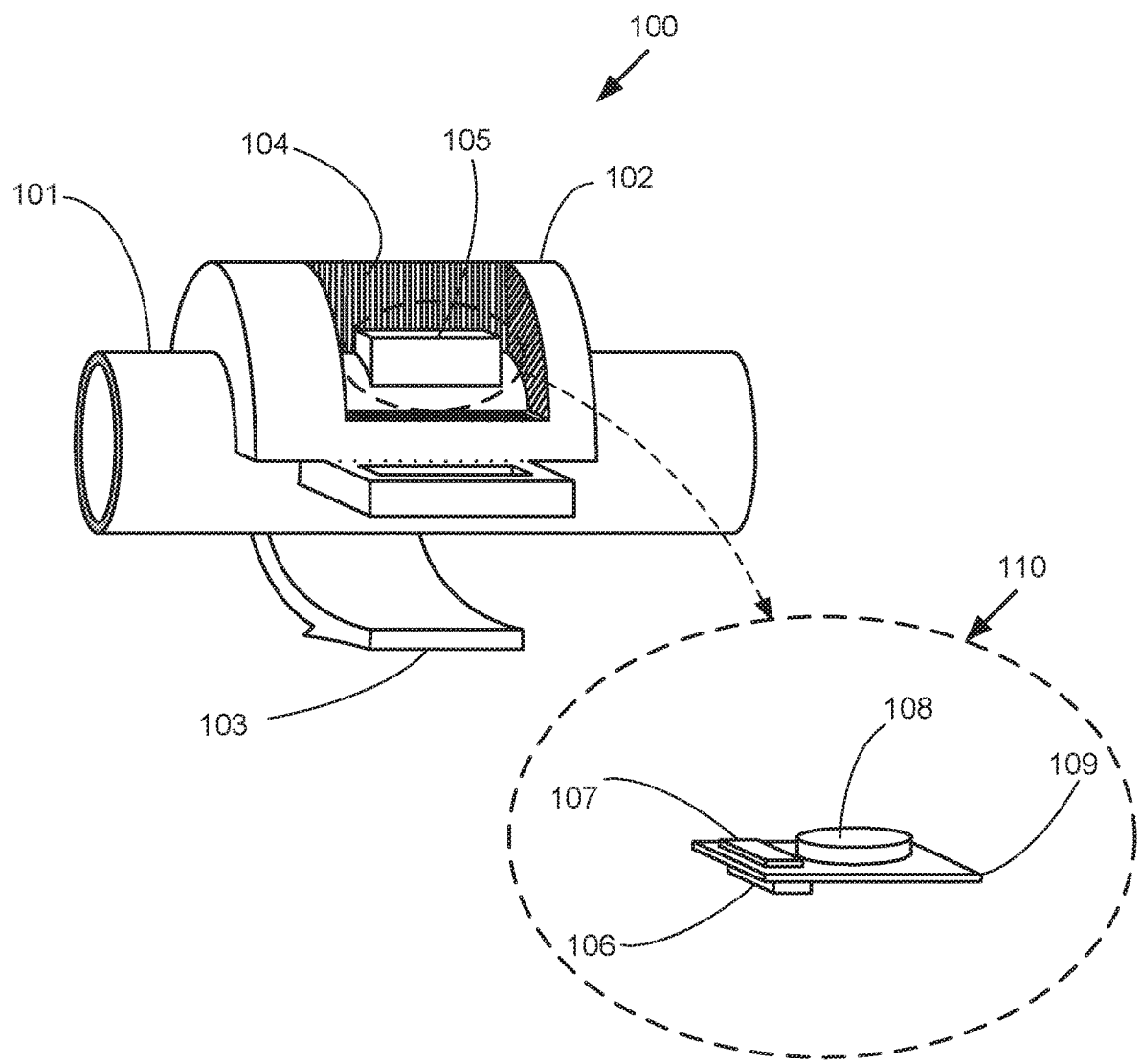
FIG. 1 shows a cutaway perspective view of one embodiment of an acoustic sensor device.

Flow detection systems for monitoring water systems, such as in a residential home, can be costly and difficult to install. In the present disclosure, embodiments of a sensing element, an acoustic capture system, and a data analysis system for use in fluid monitoring shall be described. The systems are capable of detecting leaks in plumbing systems, even up to a large scale, with reduced cost and ease of use.

Acoustic Capture and Analysis of Signals from Fluid in a Pipe

There is a long-felt need for flow sensors that are simple, low-cost, non-invasive, and easy to install. Most conventional flow meters require physical contact with the fluid, which typically requires installation by a professional plumber. Non-contact (or non-invasive) flow sensors have been commercialized using acoustic sensors. Existing acoustic flow measurement devices use active techniques, either with Doppler analysis or by differential time-of-flight analysis. These approaches require a combination of acoustic transducers and one or more acoustic sensors. Currently, to thoroughly maintain surveillance on the integrity of the water system in a house or building, a plurality of these flow sensor devices are needed, at least one per pipe branch being observed; however, the expense of multiple flow sensors can be cost-prohibitive. Current techniques are focused on supplying accurate flow rate information on the local pipe, and therefore use more complex, possibly mechanically intrusive, expensive techniques. Easy-to-install and operate flow sensors are uncommon. Most are not battery-powered and also do not have simple means to attach to a communication link. The installation process of current sensors includes physically attaching sensor(s), connecting sensor(s) to a power supply and supplying a communication link. A battery powered (cordless) solution would have a strong advantage in this regard, as electric power outlets are not always near the desired sensor mounting locations. To maximize the service life of such a device, great care needs to be paid to the use of electrical power.

Another characteristic common to the existing commercially available flow sensors is that they are designed to work in isolation. Although a flow sensor may be specifically designed for use in a system with other flow sensors, each sensor operates as an independent device, designed to accurately determine the flow rate only of the pipe to which it is attached. Gathering information from multiple sensors about a complex piping system is not possible with currently available systems.

In the present disclosure, a flow monitoring system has a cost and connectivity that enables deployment of a small fleet of sensors at every site, while maintaining sufficient accuracy for the user. The individual sensor units used in this system are non-invasive and battery powered, with extended operating life on a single battery charge. The sensor units are configured to be programmed adaptively to improve system performance parameters. These parameters may include battery life, acoustic sensitivity, leak localization and false alarm rate. The adaptive programming of the fluid flow monitoring system may be performed by an analysis system housed with at least one central processing unit.

FIG. 1 provides a cutaway view of an embodiment of a representative sensor device 100, which is a small electronics board and a sensor that is acoustically coupled to a pipe and enclosed within an inexpensive housing. Pipe 101 is the pipe being monitored. The flow sensor device 100 includes a device housing 102, which may be made of a conformal material, and a strap 103 with a clamp for mounting. The strap 103 is integral to the housing 102 for affixing the device to the pipe 101. Cutaway 104 exposes instrument package 105, which is further described in the detailed view 110. In this embodiment, instrument package 105 includes an acoustic sensor 106, a microcontroller 107 for the acoustic sensor 106, battery 108 to power the instrument package 105, and a printed circuit board 109 or other mounting means for the instrument package 105. In this embodiment, the microcontroller 107 includes integrated wireless communication and an analog to digital converter, although other configurations are possible. The battery 108 may or may not be rechargeable. The package 105 may or may not allow for battery replacement. The design with the lowest maintenance burden on the end user will have a long lifetime (e.g. 3-5 years) from a single battery charge. The device 100 acoustically couples the sensor 106, such as an accelerometer or a microphone, to the wall of a pipe carrying a fluid. The microphone may be, for example, an intimately-connected piece of piezoelectric material, or an intimately-connected microelectromechanical system (MEMS) device. The sensor 106 may be off-the-shelf or custom made. The device 100 records the acoustic signal caused by running fluid and associated fixtures (sinks, toilets, showers, dishwashers, sprinklers etc.). It will also record the acoustics when there is no fluid running, as a baseline. In one embodiment, baseline values may be based on taking samples at times of high probability of no fluid flow, for example at late night hours.

Extended battery life, for example 2 years or longer, is desired, yet battery capacity is constrained by size and cost considerations. Coin cell batteries are one low cost, compact option. These batteries typically operate at 1.8V to 3V and have limited capacity. For example a common battery is the Panasonic CR2025, with 3V output and 165 mAh capacity. Many other battery options are available, but size and cost considerations favor batteries with relatively small capacity (e.g., <1000 mAh). The desired battery life must be obtained through selection of appropriate low power components, notably the microphone, amplifier, analog to digital converter, microcontroller, and communication chips.

Microphones and accelerometers that are designed for many applications within consumer products, such as mobile phones, are particularly appropriate for use in the present acoustic sensing devices due to their low power consumption and compact size (e.g., <10 mm length and width, <5 mm thickness). An example is the Analog Devices model ADXL335 accelerometer, which is 4 mm×4 mm×1.45 mm, includes a built-in amplifier, can operate at voltages down to 1.8V and has typical current consumption of 300 microamps. However, even this low power consumption device requires additional system optimization to achieve a long battery life. If the accelerometer were continuously monitored at 300 microamps, the entire battery capacity would be used within 21 days. This does not yet include the power required to store and transmit the data.

Similarly, the analog to digital conversion and microprocessing elements are constrained by power considerations. The analog to digital converter (ADC) may be a discrete component or may be included in the microcontroller or in the acoustic sensing device. In either case, the current consumption for the ADC will typically be 30 microamps or more, for sampling rates in the acoustic range (e.g., 400 to 10,000 samples/second). Through specialized programming of the present methods, the microcontroller must limit the active time for microphone or accelerometer sensor readings in order to extend the battery life, and must itself be capable of operating with significantly reduced power between active states. An example of such a microcontroller is the Texas Instruments MSP430 family. These microcontrollers include several different operating modes with successively reduced power and functionality. For example, a standby mode with typical current consumption of 1 microamp is available.

Compact sensor size is desirable for many applications such as residential and commercial building use. Typical pipe diameters are in the range of 12 mm to 25 mm, and a sensor of similar dimensions is desirable. Selection of compact microphone or accelerometer sensor and battery are typically the most difficult, as small microcontrollers and wireless communication devices are widely available. Coin cell batteries are available with diameters of 25 mm and less. Lithium polymer batteries are also available with footprint below 25 mm and thickness below 5 mm. High sensitivity microphones or accelerometers (e.g., accelerometer sensitivity >4000 mV/g, or microphone sensitivity >−30 dBV/Pa) are typically not available in such small dimensions. Compact accelerometers are available, such as the ADXL335 mentioned previously, but sensitivity is typically 1000 mV/g or less. By using the microcontrollers mentioned above, that enable very low average power consumption, these compact devices and batteries can be selected.

Figure 2:
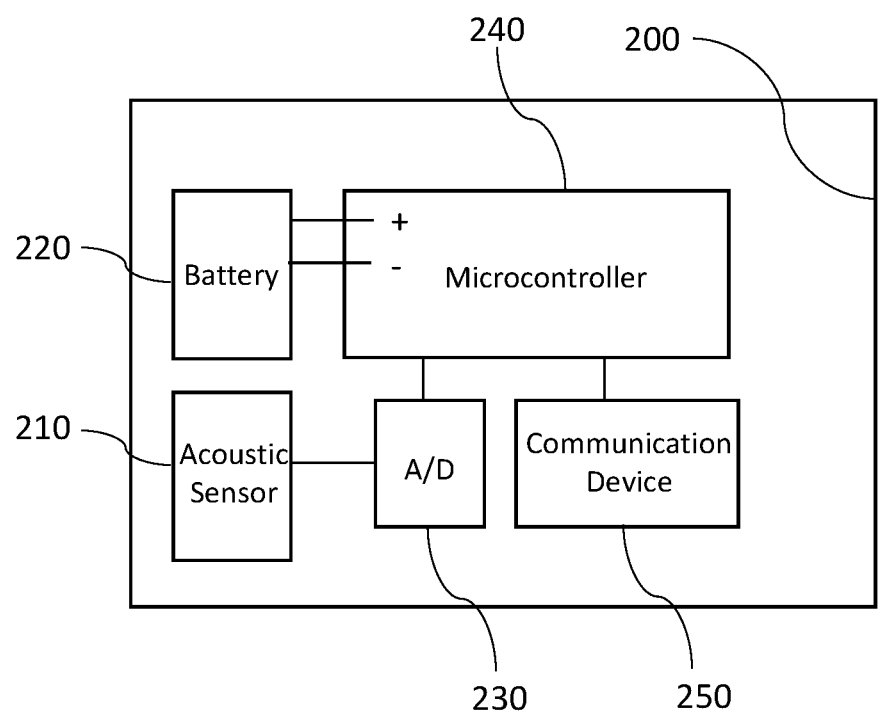
FIG. 2 is an exemplary detailed schematic of the sensor device of FIG. 1.

FIG. 2 is a schematic of an exemplary sensing device 200. Sensing device 200 includes acoustic sensor 210, battery 220, analog-to-digital convertor 230, microcontroller 240, and communication device 250. Microcontroller 240 provides local control to the individual sensing device 200. Microcontroller 240 may or may not include integrated analog-to-digital convertor 230 or integrated communication device 250. Acoustic sensor 210 may be, for example, a microphone or piezoelectric component as described above. The sensor 210 may be, for example, an accelerometer with sensitivity below 4000 mV/g, or a microphone with sensitivity less than −30 dBV/Pa. Battery 220 is a low power, compact type as described above, such as having a capacity less than 1000 mAh. The battery 220 provides power to the microcontroller 240 either directly or through a power conditioning circuit. The acoustic sensor 210, analog-to-digital convertor 230 and communication device 250 similarly receive power from the battery 220 either directly, through power conditioning circuits or from the microcontroller 240. The microcontroller 240 reads the acoustic signal from the acoustic sensor 210 either directly or indirectly. Direct measurement can be either analog, read into an analog-to-digital converter integrated into the microcontroller 240, or digital, read from an analog-to-digital converter integrated into the sensor. Indirect measurement can be either analog, where the signal from the acoustic sensor 210 is first passed through analog signal conditioning circuits, or digital, where the signal from the acoustic sensor 210 is passed through an external analog-to-digital converter. The microcontroller 240 sends and receives information via the communications device 250.

The sensor of the present disclosure is designed to be installed onto the pipe without the use of tools, such that it is efficiently attached to and detached from the pipe. To this purpose the housing (e.g. housing 102 of FIG. 1) may be constructed of conformal materials, for example a low durometer rubber or plastic. The conformal material accommodates a variety of pipe sizes while maintaining acoustic contact. There may be an integral strap or clamp that will be used to affix the device. Alternately, the device may be bonded to the pipe with, for example, an adhesive such as a pressure sensitive adhesive. The operation of affixing the device may power it up for the first time. This can be done by pulling off a tab on the device's sensing surface, by having the strap tensioning cause a switch to close, or by many other techniques known in the art. In some embodiments the assembly may contain a combination battery/hardware door/connection strap. In other embodiments the assembly may be a single, fully encapsulated device.

After it is affixed, the device will determine its health, then search for the wireless network which, via a base station, connects to an available communications network, most commonly based on wi-fi. To aid in installation, an application running on a portable device will register when the device attaches and will report the health.

This sensor device is a part of an inexpensive, robust, easily deployed system to protect buildings against damage from fluid leaks. It allows estimation of flow rates in a system of pipes without intrusion into the pipe, and without the use of high power components. It provides information needed to estimate flow and protect the building. Additionally, the sensor provides transient information on the change of flow rates within a system of pipes containing interconnected fluid-transporting pipes.

The device may or may not reduce the data set by running algorithms designed to reject non-significant data. This algorithm may, for example, be a bandpass filter or multiple bandpass filters that reject acoustic frequencies that do not give information on flow rate or give redundant information. Local processing will be performed when it results in improved sensor accuracy or sensitivity, reduced energy usage (and longer battery life) or in enhanced communications signal strength.

Figure 3:
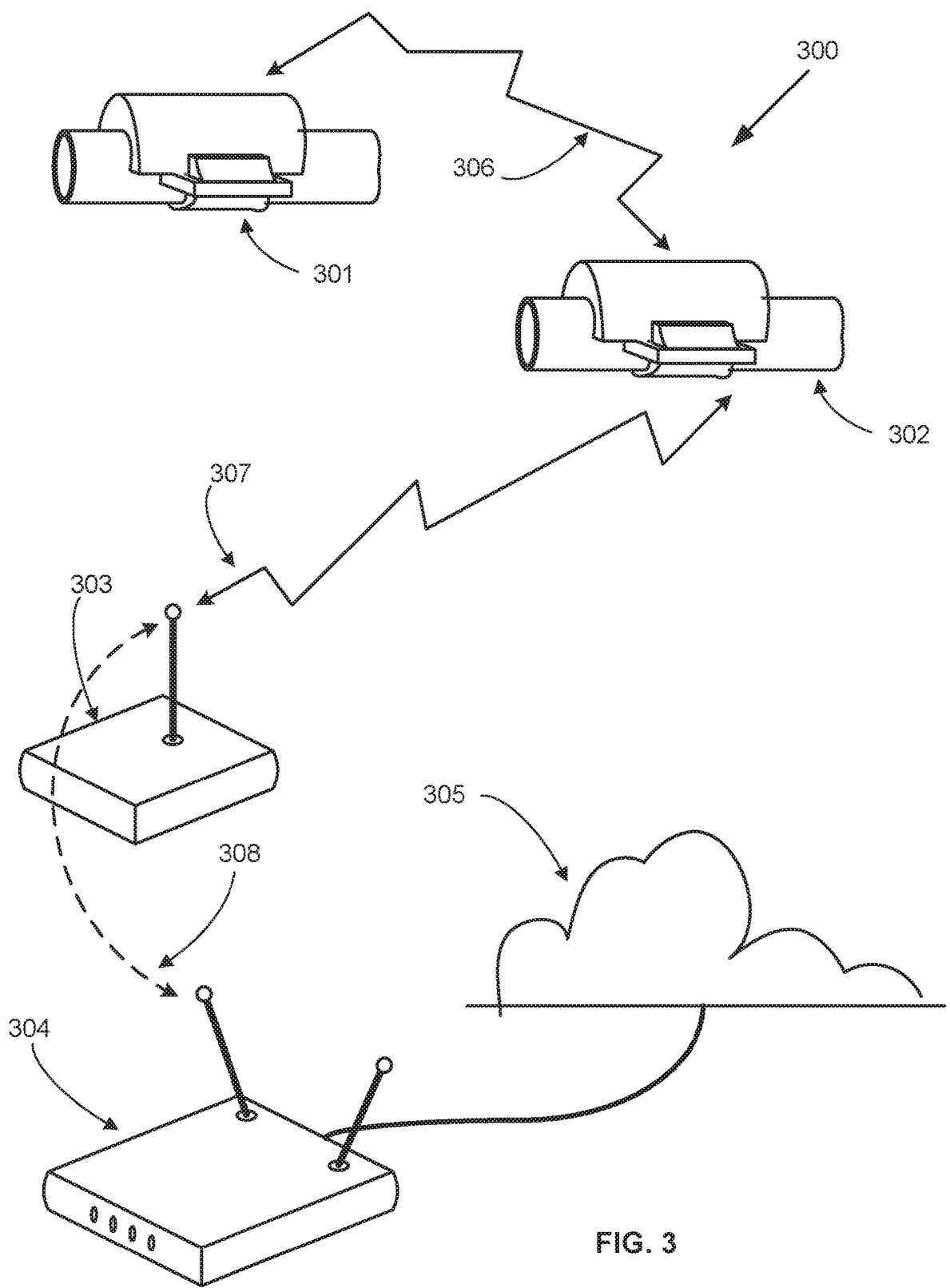
FIG. 3 is a schematic of an exemplary communications network for use with the device of FIG. 1.

FIG. 3 illustrates an exemplary communications network 300 in which a first sensor device 301 is mounted on a pipe, and a second sensor device 302 is mounted on another pipe within the same plumbing system. For comprehensive monitoring of the plumbing system, the devices may be positioned throughout the system such that their regions of coverage overlap, though this is not required for useful services to be rendered. Programmability of sensors in the present disclosure and learning algorithms of the analysis system in the present disclosure allow wide flexibility in spacing between sensors, simplifying the installation process. For example, sensor to sensor spacing may be 2 m in one part of the system and 6 m in another part of the system.

Once the system has learned the characteristic signature—for example, the relative amplitudes and frequency spectra at each sensor—of a fluid use event (e.g. toilet flush), the individual sensors can be programmed to improve response to future events, for example with a different wake-up threshold. Other components of the system may include base station 303 (optional) with root node of the mesh network, wireless local area network (e.g, wi-fi) router 304, and internet connection 305. In other embodiments, connections may be hard-wired or made via cell-phone. Arrows 306 and 307 indicate a wireless mesh connection, self-configuring, for example conforming to the Zigbee standard. Other wireless communication architectures are also possible, such as star, and point to multi-point. Arrow 308 indicates a wi-fi connection, for example, conforming to the 802.11 standard. This network is bidirectional, so the device can be commanded from the base station to, for example, take a set of samples, accept new algorithms, accept upgraded software, supply raw, unprocessed data, provide battery condition, device health information etc. The functions of base station 303, in some embodiments, may instead be provided by software in the building that is being serviced, or in a cloud (remote) network, or located elsewhere. Other computer and peripheral hardware other than those explicitly described here are also possible.

The present system utilizes the advent of low cost sensors, wireless connectivity, and highly integrated, powerful, inexpensive processors in reducing cost. Much of the signal processing can be committed to software run at remote locations. The sensors and processors themselves, targeted at the smartphone market amongst others, are very affordable. The device has a simple attachment means that will not require tools, thus facilitating easy installation. Additionally, the device has a self-contained power supply that can last for several years, and it can automatically attach itself to a wireless communications system without any user interaction.

Service life is maximized through the use of relatively new, low power sensors, processors and wireless communications hardware, many of which have been developed for remote, low maintenance applications. These devices typically have very low duty cycles, meaning that they remain dormant longer than they are actively collecting data, processing or communicating the data. For example, a given sensor device may wake up once each 10 seconds and collect data for only 100 milliseconds, corresponding to a duty cycle of 1%. This greatly reduces the average power consumption relative to a device that is on most of the time. The processor may be configured to perform data reduction, and to transmit only appropriate information. It may adaptively operate the sensors to minimize data loss and reduce power consumption. Computer and peripheral hardware in the system may, for example, be used to minimize use of battery by learning to estimate the probability of an acoustic signal's presence over time, to compress data and enable low bandwidth transmission, to prioritize data, to synchronize with a master clock, and/or to transmit acoustic data synchronized to the master clock. The duty cycle may, for example, be much lower during periods of expected inactivity in the plumbing system. Key data analysis and decisions may be made by a centralized processor.

Data Analysis System

A data analysis system to monitor the integrity of a piping system and attached equipment in a building or vessel shall now be described. Currently, to understand fluid flow within the branches of a pipe system, individual flow sensors need to be mounted along each branch. Limitations of these current techniques include the need for multiple sensors, and the inability to determine any problem other than as it affects flow measurement. That is, acoustic changes in the pipe network itself will not be registered. Furthermore, although these systems provide accurate flow rate readings, for some applications absolute accuracy may not be as critical.

In the present methodology, data from multiple sensors in a pipe system is utilized to learn about fluid flow rate and possible problems with flow. In some embodiments, the analysis system takes time-dependent data from multiple sensors of various types, e.g. flow rate, temperature, pressure, and acoustic signature. Analysis of multiple data streams may build confidence in decisions about the integrity of the system under surveillance. The sensors do not necessarily need to be mounted on every pipe branch, since the pipes work as acoustic waveguides, and in general, a unique combination of acoustic signatures from each sensor will be generated for each different flow combination. Analyzing these signatures should be sufficient to determine the branch(es) with flowing water. These signatures often will include the relative time of the onset of the signal reception, for each different signal as well as the relative amplitudes of the signal at each sensor that detects a signal.

The signatures for fluid flowing in a pipe include: (a) The mechanical "ringing" of each section of pipe when flow is initiated, turned off, or when an amount of entrained air passes through. This ringing can be used to further firm up the identity of the pipe carrying water; (b) Vibrations induced by non-laminar fluid flow within the pipes; (c) Vibrations caused by leaks, where cavitation and other turbulent behavior causes higher frequency noise; and (d) Long-period signals caused by very slow leaks resulting in droplet formation and release. There are also other reasons for an acoustic signature being generated by fluid flowing in a pipe, as would be known by one versed in the art.

Much quantitative information may be added to the above analysis technique by combining external data from an accurate flow rate measurement device at the inlet end of the pipe system to the data set from the multiple sensors to form a set of system data. More flow rate measurement devices will ease the determination, but are not strictly necessary. The process of estimating flow rates to a greater accuracy involves a learning algorithm that recognizes unique combinations of acoustic signatures from the set of sensors, correlates this with a flow rate measured by the accurate measurement device(s), and continually refines the correlation activity. Optionally, the process may run a learning program that steps the owner through a process of first recognition of the various devices on the pipe system. This program will ask the user to identify operating devices in an order designed to maximize the learning process. This process can be conveniently implemented on a mobile device or other portable computing system such as a tablet or laptop computer.

Once a reasonable determination of combinations of signatures and flows has been determined, with or without external data from an accurate flow rate measurement device, anomalous signature events can be analyzed to give an estimate of a flow problem—for example a broken or stopped pipe, or even a pipe that has come loose from the wall. The process of converting acoustic signals to flow information may be very computationally intensive, and so should be carried out where computing capacity and electrical power are inexpensive, for example in the cloud.

Embodiments of the methodology may include adaptive analysis over time that allows for the detection of very small leaks and reduces power consumption by tailoring sensor and processing usage (duty cycle). Analysis may include pattern matches with stored signatures, where the signatures may include, for example, temporal and weather information, filtered spectral information, and signatures that are "learned" via user input (e.g. toilet was flushed). Analysis may include using data on piping age and type, and/or equipment age and type. Adaptive analysis over time allows the system to warn about maintenance needs of attached equipment. Thus, the data system learns the characteristic signatures of a piping system and attached equipment in a building. Furthermore, the data system may include external data, which may include elements of weather measurements and forecasts, information about the pipe system, and information from a flow meter attached to the pipe system.

System sensitivity may be improved over individual sensor sensitivity by using the combined signals from a plurality of sensors. For example, the central processor may identify a specific acoustic frequency range or ranges active during a specific fluid flow event based on data from one of the sensors, for example the one closest to the appliance in use or closest to the leak location. The processor can adjust other sensors to focus on a subset of active acoustic frequencies which will reduce the signal to noise ratio for each sensor. The combination of these signals provides more complete information to the central processor and therefore better sensitivity and accuracy than one individual sensor. Thus, a processing component that is in communication with a plurality of sensing devices is capable of performing analysis on data captured from the sensing devices, where a system leak detection sensitivity and/or accuracy analyzed by the processing component is higher than a leak detection sensitivity and/or accuracy of the sensing devices.

Programmable sensors can therefore be used to further improve system performance. In some embodiments, the sensors may be programmable to improve the sensitivity of the detection of leaks; that is, leak identification in a pipe system. For example, leaks produce acoustic signals with different profiles than conventional fluid use, often including higher frequency components. In other embodiments, the sensors may be battery powered, and may be programmable to increase the operating time of the battery. For example, the duty cycle of a sensor may be reduced during extended periods of low fluid flow, such as nighttime or when the building is unoccupied. As another example, the power of the wireless transmitter may be reduced if the associated receiver detects sufficient signal strength. The programmability may include the sensors being at least partially directed by instructions from a central processing unit. In yet other embodiments, the programmability includes selecting certain time periods to record and process signals, and certain time periods to adopt a mode of low power dormancy. For example, the time periods may include selecting times of high fluid flow and times of negligible fluid flow. Leak localization may be improved by, for example, programming the frequency ranges for sensors proximal to the fluid leak, as determined by the strength of their overall acoustic signals. The amplitude of signals at specific frequencies—such as, frequencies that the system associates with the leak—from proximal sensors can be compared. Because acoustic waves at different frequencies attenuate at different rates along the length of a pipe, the location of the leak relative to proximal sensors can be estimated.

False alarm rates can be improved by programming sensors with different alarm thresholds. As the system is notified of false alarms, the thresholds for individual sensors can be adjusted. For example, sensors close to appliances generating strong acoustic noise (e.g. washing machines) can have increased alarm thresholds.

The analysis methodology may utilize computing resources remote from a building or buildings with sensors on the network. The methodology includes software code that embodies the various ideas enumerated above. The methodology includes communications with the sensors (which may change location, number or type over time) according to a schedule, or which may also be event driven. For example, the process may query the sensor array more often in a rain storm local to the buildings of interest. The methodology can maintain the sensors, by ensuring they have the latest software, and making enquiries of their battery state and other observable health characteristics. According to a schedule, the methodology can communicate to parties the building or sensor network owners designate, with a report indicating health of the sensor system and the pipe system, and optionally fluid usage statistics. The methodology will communicate with designated parties anytime there is a suspected problem. The action will depend on the severity of the problem. It can also command one or more optional valves to close and shut down the fluid supply. The methodology enables inexpensive, robust, easily deployed protection for buildings against damage from leaked fluid.

In one embodiment, management software running on a centralized processing unit is in communication with a plurality of sensors. In other embodiments, management software may run on a distributed set of processing units. This distribution could be, but is not limited to: 1) processing units running identical code in different geographic areas, each with a local set of sensors to supervise; or 2) distributed code running on the sensors, a base station in each house and a central processing unit or units, the combination of all capable of carrying out the functions defined herein.

In some embodiments, the system includes a mobile application, which may be used to indicate which equipment is operating, or to store data about sensor position and condition (for example, photographs). In other embodiments, the system includes devices for transmitting data to a central database, performing analysis at this central database and transmitting results back to the field. The analysis may include methods for comparing a particular building's signature and equipment data with those of other buildings, to build an understanding of likely failure mechanisms and signatures.

Figure 4:
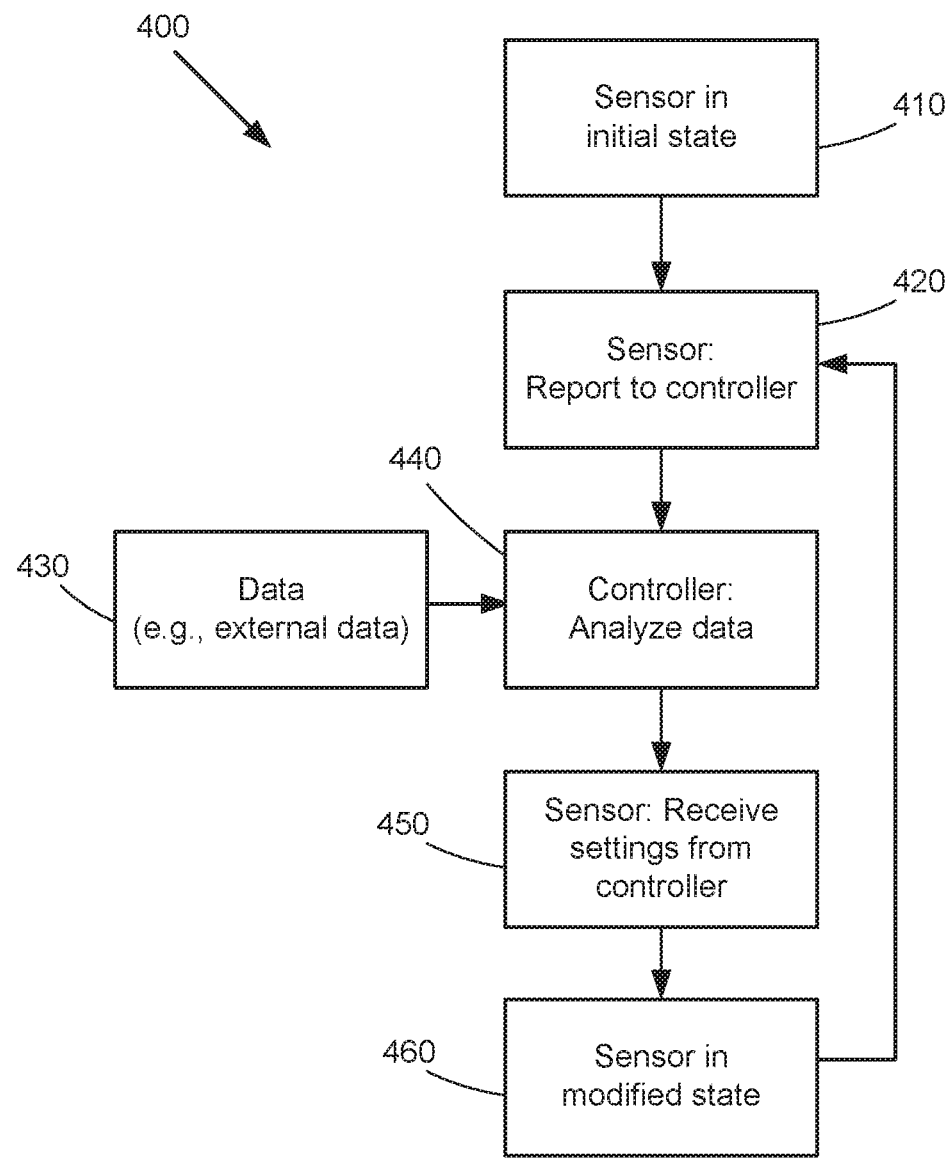
FIG. 4 is a flowchart of operation of a sensor in an acoustic sensing system, in one embodiment.

FIG. 4 illustrates a flowchart 400 depicting the operation of a sensor in an acoustic sensing system, in one embodiment. Although only one sensor is described, it shall be understood that the sensor may be one of a plurality of sensors coupled to a pipe system. A sensing device is first provided, where the sensor begins in an initial state 410. The sensing device includes an acoustic sensor (e.g., a microphone or accelerometer), an analog to digital convertor, and a local microcontroller. Sensor state settings may include microcontroller modes, acoustic frequency range(s), sampling rate, amplifier gain, ADC dynamic range, wake time, wake trigger threshold(s) or other settings. In step 420, the sensor reports to a controller for the system. That is, the data is collected from the sensing devices in the system. Information reported from the sensor may include microphone or accelerometer data (processed or unprocessed), battery condition, wireless link condition, alarms, temperature, software revision levels or other sensor status information. Data 430 may be received by the controller, such as external data including elements of weather measurements and forecasts, information about the pipe system, and information from a flow meter attached to the pipe system.

In step 440, the controller for the system analyzes the data using learning algorithms to improve accuracy and completeness of information about the distribution of flow rates. For example, the controller may be an analysis system that compares processed acoustic signatures with stored templates and historical data. The controller may also be referred to as a processing component, centralized processing unit, or central controller for the purposes of this disclosure. Acoustic signals from normal or intended fluid flow, such as a toilet flush, can thereby be more effectively differentiated from leaks or other unintended fluid flow. As another example, the analysis system may alter parameters in the sensing devices according to results of comparisons of processed acoustic signatures with the stored templates and historical data. As another example, the system may alter parameters in sensing devices based upon acoustic characteristics proximal to the sensors. If the system receives a relatively clear signal of fluid flow from one sensor, the system may tune other sensor parameters based on the frequencies received from the first sensor. As another example, the system may alter parameters in the sensing devices based upon analyses of the operation of other similarly instrumented piping systems. The system may, for example, learn the acoustic signature of certain appliances attached to the piping system, such as toilets and showers, from other installations with similar appliances and pipe construction. In some embodiments, the learning algorithms may operate on inaccurate and incomplete data. For example, the data may be missing signals from sensors that were removed, inoperable, not installed or too far from fluid flow events to detect a given event. Inaccurate data may include cases where an actual leak was mistakenly classified as a false alarm. The learning algorithms may employ, for example, support vector machines that can be robust against inaccurate and incomplete data. In other embodiments, the learning algorithms are specifically trained to characteristics of the pipe system, characteristics such as toilet flushes or shower hot and/or cold water activation and deactivation. The system may, for example, include a training interface that instructs the user to perform a specific activity (e.g. turn on the shower hot water). In this manner, sensor signal signatures can be conclusively associated with specific fluid flow events. The collection and analysis of data in steps 420 and 440 may be performed on a computer hardware processor.

Parameters received from the controller in step 450 may include acoustic frequency range(s), sampling rate, amplifier gain, ADC dynamic range, wake time, wake trigger threshold(s) or other settings. After settings are received from the controller, the sensor is now in a modified state 460 in which it has, for example, adjusted its wake time to reduce power consumption or has had its sensor parameters altered to be tuned to improve the overall system performance. The sensor will continue to report data to the controller, as depicted by step 420. Over time, this loop may be repeated based on the data from the sensor and additional data 430.

Although particular components, such as certain battery and microcontroller types, have been described, other equivalent components that meet the desired performance characteristics may be substituted.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention. Furthermore, those of ordinary skill in the art will appreciate that the foregoing description is by way of example only, and is not intended to limit the invention. Thus, it is intended that the present subject matter covers such modifications and variations.

What is claimed is:

1. A fluid flow monitoring system comprising:
   a plurality of sensors, the sensors being acoustically coupled to a pipe system comprising interconnected fluid-transporting pipes, the sensors collecting sensor data; and
   an analysis system housed with and in communication with a central processing unit, the analysis system analyzing the sensor data combined from the plurality of sensors to provide leak identification in the interconnected fluid-transporting pipes;
   wherein each sensor in the plurality of sensors is configured to be programmed adaptively by learning algorithms to improve system performance parameters; and
   wherein at least one sensor is programmable to improve a sensitivity of the system for providing the leak identification, wherein programming of the at least one sensor is adjusted based on data from another sensor in the plurality of sensors during a fluid flow event.

2. The system of claim 1 wherein the adaptive programming utilizes a characteristic signature of the pipe system.

3. The system of claim 2 wherein the characteristic signature comprises one of the group consisting of i) mechanical ringing in one of the interconnected fluid-transporting pipes when fluid flow through the pipe system is initiated or turned off, ii) vibration induced by non-laminar fluid flow within one of the interconnected fluid-transporting pipes; iii) vibration caused by a leak in one of the interconnected fluid-transporting pipes; iv) a long-period signal caused by a leak in the one of the interconnected fluid-transporting pipes and v) acoustic signals of the fluid-transporting pipes and the fluid itself from the operation of associated fixtures connected to said pipes.

4. The system of claim 1 wherein the sensors are coupled non-invasively to the pipe system.

5. The system of claim 1 wherein the system performance parameters include battery life, acoustic sensitivity, leak localization and false alarm rate.

6. The system of claim 1 wherein at least one sensor is programmable to respond to an anomalous signature event.

7. The system of claim 1 wherein at least one sensor is programmable to respond to external data.

8. The system of claim 7 wherein the external data comprises data from a flow rate measurement device external to the system, weather data, information about the pipe system, or data from another building.

9. A fluid flow monitoring system comprising:
   a plurality of sensors, the sensors being acoustically coupled to a pipe system comprising interconnected fluid-transporting pipes, the sensors collecting sensor data; and
   an analysis system housed with and in communication with a central processing unit, the analysis system analyzing the sensor data combined from the plurality of sensors to provide leak identification in the interconnected fluid-transporting pipes;
   wherein each sensor in the plurality of sensors is configured to be programmed adaptively by learning algorithms to improve system performance parameters;
   wherein at least one sensor is battery powered, the at least one sensor being programmable to increase an operating time of the battery; and
   wherein the increase in operating time includes reducing the duty cycle such that the time that the sensor is actively collecting or transmitting data is reduced during periods of inactivity.

10. The system of claim 9 wherein the adaptive programming utilizes a characteristic signature of the pipe system.

11. The system of claim 10 wherein the characteristic signature comprises one of the group consisting of i) mechanical ringing in one of the interconnected fluid-transporting pipes when fluid flow through the pipe system is initiated or turned off, ii) vibration induced by non-laminar fluid flow within one of the interconnected fluid-transporting pipes; iii) vibration caused by a leak in one of the interconnected fluid-transporting pipes; iv) a long-period signal caused by a leak in the one of the interconnected fluid-transporting pipes and v) acoustic signals of the fluid-transporting pipes and the fluid itself from the operation of associated fixtures connected to said pipes.

12. The system of claim 9 wherein the sensors are coupled non-invasively to the pipe system.

13. The system of claim 9 wherein the system performance parameters include battery life, acoustic sensitivity, leak localization and false alarm rate.

14. The system of claim 9 wherein at least one sensor is programmable to respond to an anomalous signature event.

15. The system of claim 9 wherein at least one sensor is programmable to respond to external data.

16. The system of claim 15 wherein the external data comprises data from a flow rate measurement device external to the system, weather data, information about the pipe system, or data from another building.

* * * * *